Dec. 15, 1936.　　　W. D. BURTON　　　2,064,194
HEATING SYSTEM CONTROL
Filed Nov. 13, 1930
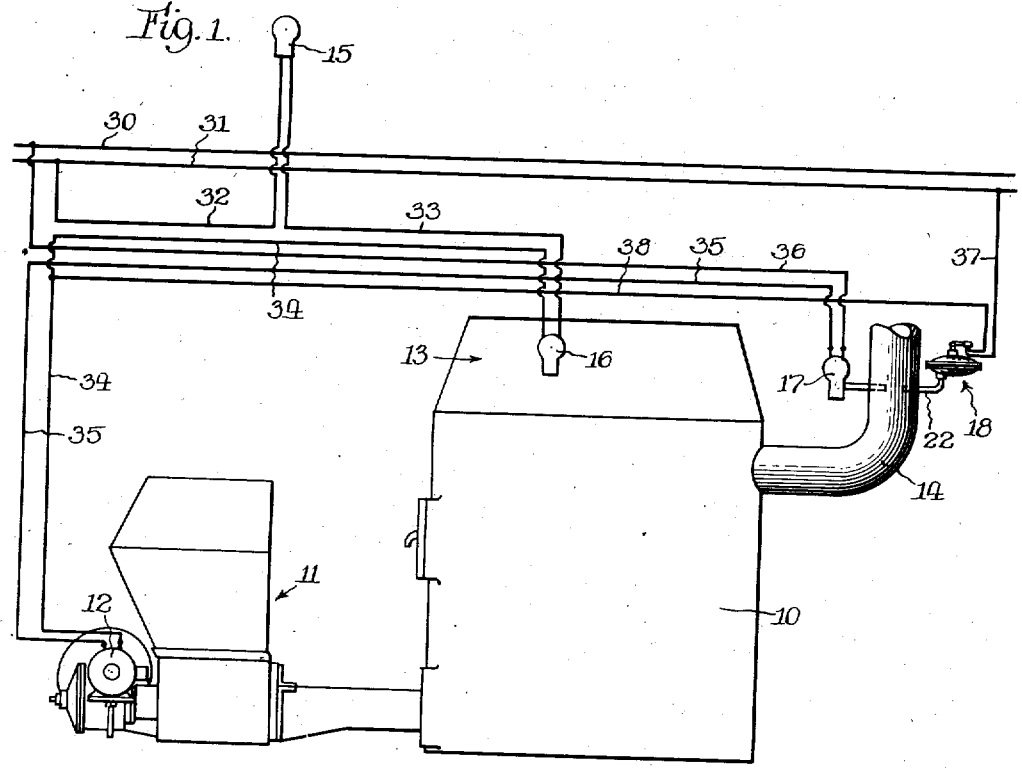
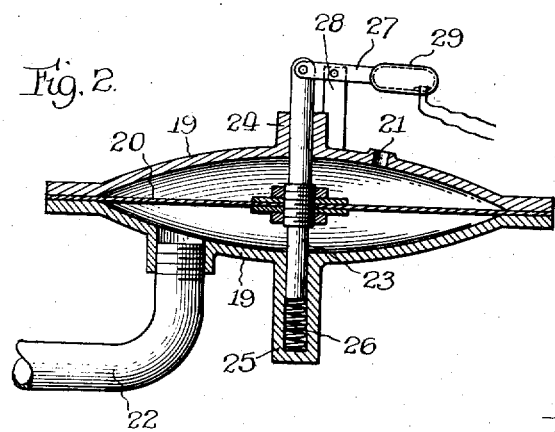
Inventor:
Warren Dean Burton,
By Chindahl, Parker & Carlson
Attys.

Patented Dec. 15, 1936

2,064,194

UNITED STATES PATENT OFFICE 2,064,194

HEATING SYSTEM CONTROL

Warren Dean Burton, Goshen, Ind., assignor, by mesne assignments, to Minneapolis-Honeywell Regulator Company, a corporation of Delaware Application November 13, 1930, Serial No. 495,407

21 Claims. (Cl. 236—9)

The invention relates generally to heating system controls, and more particularly to a control for heating systems embodying automatic means for supplying fuel thereto.

An object of the invention is to provide a new and improved control for heating systems which governs the operation of the system according to substantially all operating contingencies which may arise.

Another object of the invention is to provide a new and improved means for controlling the operation of the system, when said system is operating under substantially minimum heat requirement conditions so that permanent cessation of operation of the system is prevented.

A further object of the invention is to provide a novel control for a system of this character embodying a pressure responsive control operable at a predetermined minimum pressure of the gaseous products of combustion to prevent extinguishment of the fire.

More specifically stated, another object of the invention resides in the provision of a pressure responsive device located in the exhaust stack of the heating system, which device is adapted at a predetermined pressure to effect energization of a circuit for controlling the operation of a fuel supplying mechanism.

In conjunction with the foregoing, the invention provides, as an object, a heating system having control circuits embodying a remotely positioned maximum temperature responsive device, a maximum temperature responsive device located adjacent the furnace, a minimum temperature responsive device, and a low-pressure responsive device, said maximum temperature responsive device circuits and said minimum temperature responsive device circuit being interrelated to control the operation of a fuel supplying means, while said low pressure responsive device circuit is operative independently of the maximum temperature responsive device circuits to control the operation of the fuel supplying means and is inoperative when the low temperature device circuit is open.

Other objects and advantages will become apparent in the following description and from the accompanying drawing, in which:

Figure 1 is a diagrammatic plan and wiring diagram of a heating system embodying the features of the present invention.

Fig. 2 is a detail in central section of a pressure responsive device and its connection with the heating system.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

With particular reference to the drawing, 10 designates generally a warm air furnace of any suitable size and construction to which fuel is supplied by a stoker 11, in this instance of the underfeed type, driven by an electric motor 12. The furnace may include a warm air compartment 13, which compartment is substantially the equivalent of the steam, vapor or hot water chambers in furnaces of other types. A stack 14 for exhausting the products of combustion communicates with the combustion chamber of the furnace.

It will be understood that this particular type of heating system is chosen merely for illustrative purposes and that the present heating system control is well adapted for use in connection with heating systems and stokers of other types without substantial modification.

The present control for the heating system embodies a means located at a remote point from the furnace, as in a room heated thereby, for preventing operation of the stoker 11 when the temperature is above a predetermined point, a similar means located adjacent the furnace (both of which means may be characterized as maximum temperature responsive devices), a means associated with the furnace for preventing operation of the stoker when the fire is out, (which means constitutes a minimum temperature responsive device), and a means for initiating and stopping operation of the stoker, when the heating system is operating at low heating requirements, to prevent the fire from becoming extinguished. These means are interconnected and associated for interrelated or independent control, as will hereinafter become apparent, in order to meet substantially any operating contingency which might arise.

In the illustrated embodiment, referring to Fig. 1, a thermostat 15, embodying switch contacts arranged to be open above a desired and predetermined room temperature, is located in any room or the like which is to be supplied with heat by the furnace 10. This thermostat controls the room temperature. A similar thermostat 16 also embodying switch contacts is mounted in the compartment 13. The contacts controlled by the thermostat are separated when a maximum temperature within the compartment is reached, which temperature is, of course, determined by the requirements of the entire system, and is, in effect, a safeguard to prevent the furnace from becoming overheated.

A thermostat 17 is associated with the combustion chamber of the furnace, and in the present embodiment is mounted on the stack 14 to respond to temperature changes of the waste gases passing from the combustion chamber. The thermostat 17 embodies switch contacts separable at such a temperature of the exhaust gases as indicates that the fire in the furnace is out or nearly so. This device, therefore, controls the stoker motor to prevent operation of the stoker under such conditions that the supplied fuel would accumulate unburned in the fire box of the furnace.

When the heating system is operating under low heat requirement conditions, that is, when the stoker is operated only at irregular and long-spaced intervals, there is a possibility that the fire will become extinguished in the interval between stokings. Means, therefore, is provided, operating independently of the maximum temperature thermostats 15 and 16, to initiate operation of the stoker when the fire reaches a point at which it is in danger of becoming extinguished and to stop such operation when sufficient fuel has been added to hold the fire. This means is arranged to respond to fluctuations of conditions within the combustion chamber which are caused directly or indirectly by temperature variations, and in this embodiment is responsive to changes occurring within the stack 14. Preferably, a pressure responsive device, indicated generally at 18, connected to the stack 14, is employed.

Referring to Fig. 2, a suitable device of this character is illustrated as comprising opposed concave casing walls 19 marginally secured together with a diaphragm 20 traversing the chamber formed by the walls. One side of the diaphragm is vented to atmosphere through a port 21, and the other side thereof is in communication with the interior of the stack through a conduit 22. Axially, the diaphragm carries a pin or rod 23, one end of which is slidable through a bearing 24 in one wall. The other end of the pin 23 is seated in a closed bushing 25, a spring 26 being interposed between the end of the pin and the bushing for purposes of adjustment. The end of the rod which projects through the bearing 24 is pivotally connected to an arm 27 which, in turn, is pivotally supported by a bracket 28 rigid with the casing. The freely swinging end of the arm carries a mercury switch 29 of well-known construction.

In the passage of gas through a stack, the pressure within the stack depends largely upon the temperature of the gas. If the temperature is substantially equal to the atmospheric temperature, the pressure is likewise substantially equal to that of the atmosphere, and as the temperature of the gas increases the pressure within the stack varies inversely. Hence, the present device 18 is so connected to the stack that, as the pressure within the stack approaches atmospheric pressure (the diaphragm 20 moving accordingly to a substantially balanced condition), the mercury switch 29 is swung to establish a circuit therethrough. Inversely, as the temperature in the stack increases, the pressure decreases and the switch is swung by the diaphragm movement to open or break the circuit.

The control circuits will now be described. 30 and 31 indicate power supply lines or mains connected to any suitable source of current. The remote thermostat 15 is connected to line 31 by lead 32 and to adjacent thermostat 16 by lead 33. Thermostat 16, in turn, is connected by lead 34 to one side of the winding of the motor 12, the other side of which is connected by lead 35 to low temperature thermostat 17. Lead 36 between thermostat 17 and line 30 completes the circuit. The mercury switch 29 is connected by lead 37 to line 31 and by lead 38 to lead 34 between the thermostat 16 and motor 12.

It will be apparent that certain relationships of the controlling devices have been produced by these circuits. Thus, the remote and adjacent maximum temperature thermostats 15 and 16, and the minimum temperature thermostat 17, are connected in series with the motor, the thermostat 17 and the control device 18 are connected in series with the motor, and the thermostats 15 and 16 and the control device 18 are connected in parallel with the motor. In consequence, thermostats 15, 16 and 17 are interdependent in their control of motor operation, and confine the operating range of the motor between upper and lower limits of temperature. Thermostat 17 and control device 18 are also dependent and prevent the intermittent feeding operation of the motor (as governed by the device 18) from taking place when the fire is out. Control device 18 is independent of thermostats 15 and 16 whereby the intermittent fire replenishing feeding may occur as often as is necessary.

It will be evident from the foregoing that a novel control for a heating system has been provided which is capable of meeting substantially all operating contingencies. The temperature of a room may be maintained at a practically constant level. If, for any reason, the room temperature control fails to function, other controls prevent overheating of the furnace or, if the fire becomes extinguished, prevent further feeding of fuel. Independently, however, a further control intermittently causes fuel to be supplied to the furnace in order to hold the fire when low or substantially minimum temperatures are required, which last control is inoperative if the fire has already become extinguished.

I claim as my invention:

1. In a heating system, the combination of means for supplying fuel for heating purposes, and a pressure responsive control for said means actuated by a predetermined minimum pressure of the gaseous products of combustion to initiate operation of said fuel supplying means when said means is idle whereby to prevent permanent cessation of operation of the system when heat requirements are low.

2. In a heating system, the combination of a furnace having a stack, power driven means for supplying fuel to said furnace, and control means in said stack responsive to variations of pressure within said stack only to initiate or discontinue the operation of said fuel supplying means.

3. A control for a heating system embodying a furnace, a stack, and means including a driving motor for supplying fuel to said furnace comprising, in combination, a pressure responsive device connected to said stack for operative movement according only to variations therein, a make or break switch operable by the movements of said device, and a circuit including said switch and said motor.

4. A control for a heating system embodying a furnace and means including a driving motor for supplying fuel to said furnace comprising, in combination, a motor circuit including a control device connected to said furnace and responsive to variations of fire conditions therein when the heating system is operating under low heat requirement conditions to prevent permanent cessations of operation of the system, a second motor circuit connected in series with said first-mentioned circuit, said second circuit including a minimum temperature responsive device adapted to open said circuit when the fire is substantially extinguished, and a third circuit including one or more maximum temperature responsive devices connected in series and arranged to discontinue the operation of said motor when the temperature at said devices exceeds a predetermined point, said third circuit and said second circuit being connected in series and said third circuit and said first circuit being connected in parallel.

5. In a heating system, the combination of power-driven means for supplying fuel for heating purposes, a pressure responsive device disposed for operation by the pressure of the gaseous products of combustion, and control means for starting and stopping said power driven means operably connected with said pressure responsive device for actuation at a predetermined minimum pressure to initiate operation of said power driven means whereby to prevent permanent cessation of operation of the system when the system is only operating at infrequent intervals under minimum heat requirement conditions.

6. A system of the class described comprising, in combination, a coal stoker for heating a furnace, a device responsive to the temperature of the space to be heated thereby for operating said stoker when the temperature of the space to be heated falls below a predetermined minimum, and mechanism responsive to the temperature of the gases leaving the furnace for preventing operation of the stoker if the fire becomes extinguished.

7. A system of the class described comprising, in combination, a coal stoker for heating a furnace, a device responsive to the temperature of the space to be heated thereby for operating the stoker when said temperature falls below a predetermined minimum, means for operating the stoker under low heat requirement conditions to maintain the fire irrespective of the temperature of the space to be heated, and mechanism responsive to a furnace condition for preventing operation of the stoker if the fire becomes extinguished.

8. A system of the class described comprising, in combination, a coal stoker for heating a furnace, a device responsive to the temperature of the space to be heated thereby for operating the stoker, and mechanism responsible to the temperature of the products of combustion for preventing operation of the stoker by said device if the fire becomes extinguished.

9. A control system of the class described comprising, in combination, an electrically operated stoker for heating a furnace, a room thermostat normally in control thereof, a fire maintaining switch for operating the stoker to maintain the fire under low heat requirement conditions irrespective of the temperature at the room thermostat, a lock-out switch responsive to a furnace condition for preventing operation of the stoker if the furnace condition indicates that the fire has probably become extinguished, and means for returning the system to automatic control if the furnace condition returns to a point indicating that the fire was not extinguished without operation of the stoker.

10. A device for controlling a burner for heating a space with means for automatically stopping the burner when the fire gets too low, in combination with means to maintain a fire regardless of the temperature of the heated space, in combination with a means to prevent too hot a fire.

11. A device for controlling a burner for heating a space, with means to automatically stop the burner when the fire is too low to rekindle, in combination with means to maintain a fire regardless of temperature in the space heated, in combination with means to prevent too hot a fire, in combination with a thermostat in the space heated.

12. A device for controlling a burner for heating a space with means to automatically stop the burner when the fire is too low to rekindle, in combination with a thermostat in the space heated, in combination with a thermostatic regulator to operate the burner according to temperatures at the heat sensitive part of the regulator.

13. In a control system, in combination, an electrically operated stoker, and a circuit for controlling the same including a room thermostat and a fire maintaining switch in parallel and a lock-out switch in series with both the room thermostat and fire maintaining switch.

14. In a system for controlling the condition of a space having stoker means for supplying solid fuel to a furnace, the combination of means responsive to the condition of the space for controlling said fuel supplying means, means responsive to furnace conditions for preventing operation of the fuel supplying means if the furnace condition becomes abnormal, and means responsive to furnace conditions for preventing operation of the fuel supplying means if the fire becomes substantially extinguished.

15. In a system for controlling the temperature of a space, the combination of, stoker means for supplying solid fuel to a furnace, thermostatic means responsive to space temperatures, thermostatic means responsive to furnace temperatures, both of said thermostatic means controlling the operation of said fuel supplying means, and thermostatic means responsive to furnace temperatures for preventing operation of the fuel supplying means if the fire becomes substantially extinguished.

16. In a system for controlling the temperature of a space, the combination of, means for supplying fuel to a furnace, a pressure responsive control for said means actuated by a predetermined pressure of the gaseous products of combustion to initiate operation of said fuel supplying means, and thermostatic means responsive to the temperature of the furnace for preventing operation of the fuel supplying means if the fire becomes substantially extinguished.

17. In a system for controlling the condition of a space having stoker means for supplying solid fuel to a furnace, the combination of means responsive to the condition of the space for controlling said fuel supplying means, means responsive to the condition of the furnace for controlling the fuel supplying means independently of the space condition responsive means, and means responsive to the condition of the furnace for preventing operation of the fuel supplying means by either of the condition responsive means if the fire becomes substantially extinguished.

18. In a system for controlling the temperature of a space, the combination of stoker means for supplying solid fuel to a furnace, thermostatic means responsive to space temperature for controlling said fuel supplying means, means responsive to the condition of the fire for controlling the fuel supplying means, and means responsive to furnace temperatures for preventing operation of said fuel supplying means by said thermostatic means or said fire condition responsive means if the fire becomes substantially extinguished.

19. In a system for controlling the temperature of a space, the combination of, stoker means for supplying solid fuel to a furnace, thermostatic means responsive to space temperatures, thermostatic means responsive to furnace temperatures, means responsive to the condition of the fire, said thermostatic means and said responsive means being so arranged as to control the fuel supplying means, and thermostatic means responsive to furnace temperatures for preventing operation of said fuel supplying means if the fire becomes substantially extinguished.

20. In a system for controlling the condition of a space having stoker means for supplying solid fuel to a furnace, the combination of means responsive to the condition of the space for controlling said fuel supplying means, means responsive to the condition of the furnace for controlling the fuel supplying means independently of the space condition responsive means, means responsive to the condition of the furnace for preventing operation of the fuel supplying means by either of the condition responsive means if the fire becomes substantially extinguished, and means responsive to furnace conditions for preventing operation of said fuel supplying means by said space condition responsive means.

21. In a system for controlling the temperature of a space, the combination of stoker means for supplying solid fuel to a furnace, thermostatic means responsive to space temperature for controlling said fuel supplying means, means responsive to the condition of the fire for controlling the fuel supplying means, means responsive to furnace temperatures for preventing operation of said fuel supplying means by said thermostatic means or said fire condition responsive means if the fire becomes substantially extinguished, and means responsive to a predetermined furnace temperature for preventing operation of said fuel supplying means by said space thermostatic means.

WARREN DEAN BURTON.

---

CERTIFICATE OF CORRECTION.

Patent No. 2,064,194.            December 15, 193

WARREN DEAN BURTON.

It is hereby certified that error appears in the printed specification of the above numbered patent requiring correction as follows: Page 3, first column, line 63-64, claim 8, for the word "furnace" read space; line 66, same claim, for "responsible" read responsive; and that the said Letters Patent should be read with these corrections therein that the same may conform to the record of the case in the Patent Office.

Signed and sealed this 9th day of March, A. D. 1937

(Seal)                                                 Henry Van Arsdale
                                                       Acting Commissioner of Patents.

of the space condition responsive means, and means responsive to the condition of the furnace for preventing operation of the fuel supplying means by either of the condition responsive means if the fire becomes substantially extinguished.

18. In a system for controlling the temperature of a space, the combination of stoker means for supplying solid fuel to a furnace, thermostatic means responsive to space temperature for controlling said fuel supplying means, means responsive to the condition of the fire for controlling the fuel supplying means, and means responsive to furnace temperatures for preventing operation of said fuel supplying means by said thermostatic means or said fire condition responsive means if the fire becomes substantially extinguished.

19. In a system for controlling the temperature of a space, the combination of, stoker means for supplying solid fuel to a furnace, thermostatic means responsive to space temperatures, thermostatic means responsive to furnace temperatures, means responsive to the condition of the fire, said thermostatic means and said responsive means being so arranged as to control the fuel supplying means, and thermostatic means responsive to furnace temperatures for preventing operation of said fuel supplying means if the fire becomes substantially extinguished.

20. In a system for controlling the condition of a space having stoker means for supplying solid fuel to a furnace, the combination of means responsive to the condition of the space for controlling said fuel supplying means, means responsive to the condition of the furnace for controlling the fuel supplying means independently of the space condition responsive means, means responsive to the condition of the furnace for preventing operation of the fuel supplying means by either of the condition responsive means if the fire becomes substantially extinguished, and means responsive to furnace conditions for preventing operation of said fuel supplying means by said space condition responsive means.

21. In a system for controlling the temperature of a space, the combination of stoker means for supplying solid fuel to a furnace, thermostatic means responsive to space temperature for controlling said fuel supplying means, means responsive to the condition of the fire for controlling the fuel supplying means, means responsive to furnace temperatures for preventing operation of said fuel supplying means by said thermostatic means or said fire condition responsive means if the fire becomes substantially extinguished, and means responsive to a predetermined furnace temperature for preventing operation of said fuel supplying means by said space thermostatic means.

WARREN DEAN BURTON.

CERTIFICATE OF CORRECTION.

Patent No. 2,064,194. December 15, 193

WARREN DEAN BURTON.

It is hereby certified that error appears in the printed specification of the above numbered patent requiring correction as follows: Page 3, first column, line 63-64, claim 8, for the word "furnace" read space; line 66, same claim, for "responsible" read responsive; and that the said Letters Patent should be read with these corrections therein that the same may conform to the record of the case in the Patent Office.

Signed and sealed this 9th day of March, A. D. 1937

(Seal)

Henry Van Arsdale
Acting Commissioner of Patents.

CERTIFICATE OF CORRECTION.

Patent No. 2,064,194.

December 15, 193

WARREN DEAN BURTON.

It is hereby certified that error appears in the printed specification of the above numbered patent requiring correction as follows: Page 3, first column, line 63-64, claim 8, for the word "furnace" read space; line 66, same claim, for "responsible" read responsive; and that the said Letters Patent should be read with these corrections therein that the same may conform to the record of the case in the Patent Office.

Signed and sealed this 9th day of March, A. D. 1937

Henry Van Arsdale
Acting Commissioner of Patents.

(Seal)